(12) United States Patent
Ha et al.

(10) Patent No.: US 11,516,661 B2
(45) Date of Patent: Nov. 29, 2022

(54) METHOD AND APPARATUS FOR CONTROLLING MOVING OBJECT USING MASTER IDENTITY DEVICE AND SLAVE IDENTITY DEVICE

(71) Applicants: HYUNDAI MOTOR COMPANY, Seoul (KR); KIA MOTORS CORPORATION, Seoul (KR)

(72) Inventors: Jae Jun Ha, Hwaseong-si (KR); Young Jun Moon, Sejong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 80 days.

(21) Appl. No.: 17/168,062

(22) Filed: Feb. 4, 2021

(65) Prior Publication Data
US 2021/0250764 A1  Aug. 12, 2021

(30) Foreign Application Priority Data
Feb. 7, 2020  (KR) .................. 10-2020-0014647

(51) Int. Cl.
| | |
|---|---|
| *H04W 84/18* | (2009.01) |
| *H04W 12/06* | (2021.01) |
| *H04W 12/71* | (2021.01) |
| *H04W 76/14* | (2018.01) |
| *H04W 12/50* | (2021.01) |
| *H04W 4/40* | (2018.01) |

(52) U.S. Cl.
CPC ............ *H04W 12/06* (2013.01); *H04W 4/40* (2018.02); *H04W 12/50* (2021.01); *H04W 12/71* (2021.01); *H04W 76/14* (2018.02); *H04W 84/18* (2013.01)

(58) Field of Classification Search
CPC ....... H04W 12/06; H04W 4/40; H04W 12/50; H04W 12/71; H04W 76/14; H04W 84/18; H04W 12/08; H04W 12/40; H04W 12/72; H04W 84/20; H04W 12/37; B60W 60/001; B60W 10/20; B60W 50/14; B60W 2050/0064; B60W 2556/45; B60W 2556/50; B60R 16/023
See application file for complete search history.

(56) References Cited

U.S. PATENT DOCUMENTS

2017/0374550 A1* 12/2017 Auer .................. H04B 5/0025

* cited by examiner

*Primary Examiner* — Marcus Hammonds
(74) *Attorney, Agent, or Firm* — Morgan, Lewis & Bockius LLP

(57) ABSTRACT

A method of operating a moving object having at least one identity device includes: setting authority for the at least one identity device which includes a master identity device and at least one slave identity device; transmitting a link request message to one among the at least one slave identity device; receiving a link response message from the slave identity device; and transmitting a link permission message indicating link permission to the slave identity device. The moving object is configured to be controlled by at least one of the master identity device or the first slave identity device.

19 Claims, 16 Drawing Sheets

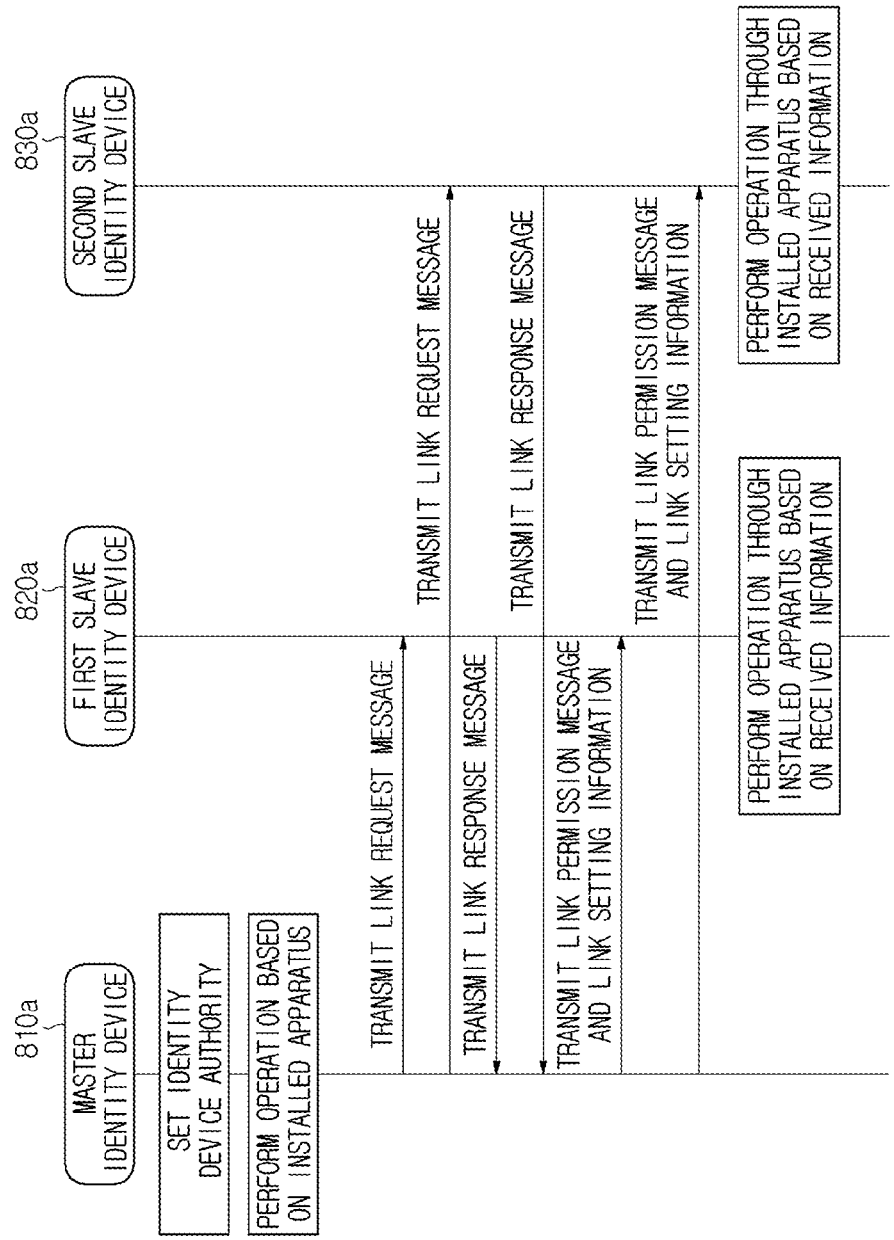

FIG. 12
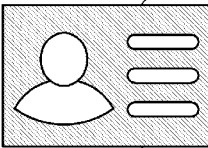
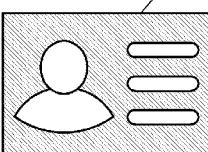

METHOD AND APPARATUS FOR CONTROLLING MOVING OBJECT USING MASTER IDENTITY DEVICE AND SLAVE IDENTITY DEVICE

CROSS REFERENCE TO RELATED APPLICATION

The present application claims the benefit of priority to Korean Patent Application No. 10-2020-0014647 filed Feb. 7, 2020, the entire contents of which is incorporated herein for all purposes by this reference.

TECHNICAL FIELD

The present disclosure relates to a method and an apparatus for controlling a moving object and a user device using a master identity device and a slave identity device.

BACKGROUND

Subscriber identity modules (SIMs) are used in smart devices or smartphones. In addition, universal subscriber identity module (USIM) technology is an evolution of a SIM card and may be a step up from the SIM used in a Global System for Mobile Communications (GSM). The USIM may be a small chip essentially inserted into an asynchronous third-generation mobile communication (WCDMA; Wideband Code Division Multiple Access) terminal capable of video calling. The USIM includes a small CPU and a memory. The CPU may identify a user using an encryption/decryption function and the memory may be used as a storage space for additional services. The USIM has been used in various forms. Such a SIM card is applicable to a moving object, which will be described below.

The moving object may operate based on full autonomous driving. For example, the moving object may perform communication with other devices via a communication network and operate based on information received through communication. However, in the moving object, a plurality of operations and functions may be defined for the purpose of movement. When identification and authentication are not guaranteed, a security problem or a risk of an accident may occur. In view of the foregoing, the moving object may be turned on differently from the existing method and may be controlled when identification and authentication are performed based on the identity device. Therefore, a method of securing controlling a moving object and a user device needs to be developed.

The information included in this Background section is only for enhancement of understanding of the general background of the present disclosure and may not be taken as an acknowledgement or any form of suggestion that this information forms the prior art already known to a person skilled in the art.

SUMMARY

An object of the present disclosure is to provide a method and apparatus for controlling a moving object using an identity device.

Another object of the present disclosure is to provide a method and apparatus for identifying a moving-object user based on an identity device and providing a service to the identified user.

Another object of the present disclosure is to provide a method and apparatus for enabling users to control a user device or a moving object using one master identity device and a plurality of slave identity devices.

According to an embodiment of the present disclosure, a method of operating a moving object having at least one identity device includes: setting authority for the at least one identity device which includes a master identity device and at least one slave identity device; transmitting a link request message to one among the at least one slave identity device; receiving a link response message from the slave identity device; and transmitting a link permission message indicating link permission to the slave identity device, wherein the moving object is configured to be controlled by at least one of the master identity device or the first slave identity device.

A user device, in which the first slave identity device is installed, may have authority to access a service performed based on the moving object.

The user device, in which the first slave identity device is installed, may include at least one of another moving object different from the moving object, a smartphone, a tablet PC, a laptop, a smartphone, a smart watch, an Internet of Things (IOT) device, a navigation device, a wearable device or a body insert chip.

The service performed based on the moving object may include at least one of a network access service performed using a network equipment provided in the moving object or a service performed using software provided in the moving object.

The master identity device may have at least one of user setting authority for at least one of the master identity device or the at least one slave identity device, authority setting rights for the at least one slave identity device or communication setting authority for a user device, in which the at least one slave identity device is installed.

Operation of the moving object capable of being controlled by the master identity device may include position or height setting of a seat including a driver's seat, indoor lighting color setting, indoor lighting brightness setting, setting of an air conditioner including an inside temperature, navigation setting, TV and radio setting, content setting, wireless communication connection mode setting, steering wheel control, autonomous driving variable setting, room-mirror and sideview-mirror position and angle setting, wiper setting, transmission setting mode or instrument panel mode setting.

The first slave identity device may have limited authority to control a moving object compared to the master identity device.

Operation of the moving object capable of being controlled by the first slave identity device may include at least one of position or height setting of a seat excluding a driver's seat, indoor lighting color setting, indoor lighting brightness setting, setting of an air conditioner including an inside temperature, navigation setting, TV and radio setting, content setting or wireless communication connection mode setting.

The method of operating the moving object may further include, when a state of the master identity device is switched from an available state to an unavailable state, transmitting an unavailability notification message indicating that the master identity device is in the unavailable state to the first slave identity device.

A state of the first slave identity device, which has received the unavailability notification message, may be set to an unavailable state regardless of a current state of the first slave identity device.

The method of operating the moving object may further include, when a state of the master identity device is switched from an unavailable state to an available state, transmitting an availability notification message indicating that the master identity device is in the available state to the first slave identity device.

A state of the first slave identity device, which has received the availability notification message, may be set in consideration of a current state of the first slave identity device.

The method of operating the moving object may further include receiving, from the at least one slave identity device, an unavailability notification message indicating that a state of the first slave identity device has been switched from an available state to an unavailable state, and updating state information of the first slave identity device.

The method of operating the moving object may further include transmitting recovery information message to the first slave identity device, and the first slave identity device, which has received the recovery information message, may determine whether to switch the state of the first slave identity device to the available state.

The method of operating the moving object may further include, by the master identity device, receiving a recovery response message from the first slave identity device, and the recovery response message may be information indicating whether the state of the first slave identity device has been switched to the available state.

The recovery information message may be periodically transmitted to the first slave identity device until the recovery response message is received.

The master identity device may be an embedded subscriber identity module (SIM) installed in the moving object, and the at least one slave identity may be a detachable SIM.

According to another embodiment of the present disclosure, a moving object having at least one identity device includes: a transceiver configured to transmit and receive a signal; and a processor configured to control the transceiver. The processor is configured to set authority for at least one identity device which includes a master identity device and at least one slave identity device, transmit a link request message to one among the at least one slave identity device, receive a link response message from the slave identity device, and transmit a link permission message indicating link permission to the slave identity device. The moving object is configured to be controlled by at least one of the master identity device or the slave identity device.

A user device, in which the first slave identity device is installed, may have authority to access a service performed based on the moving object.

The user device, in which the first slave identity device is installed, may include at least one of another moving object different from the moving object, a smartphone, a tablet PC, a laptop, a smartphone, an Internet of Things (IOT) device, a navigation device, a wearable device or a body insert chip.

The service performed based on the moving object may include at least one of a network access service performed using a network equipment provided in the moving object or a service performed using software provided in the moving object.

The master identity device may have at least one of user setting authority for at least one of the master identity device or the at least one slave identity device, authority setting rights for the at least one slave identity device or communication setting authority for a user device, in which the at least one slave identity device is installed.

Operation of the moving object capable of being controlled by the master identity device may include position or height setting of a seat including a driver's seat, indoor lighting color setting, indoor lighting brightness setting, setting of an air conditioner including an inside temperature, navigation setting, TV and radio setting, content setting, wireless communication connection mode setting, steering wheel control, autonomous driving variable setting, roommirror and sideview-mirror position and angle setting, wiper setting, transmission setting mode or instrument panel mode setting.

The first slave identity device may have limited authority to control a moving object compared to the master identity device.

Operation of the moving object capable of being controlled by the first slave identity device may include at least one of position or height setting of a seat excluding a driver's seat, indoor lighting color setting, indoor lighting brightness setting, setting of an air conditioner including an inside temperature, navigation setting, TV and radio setting, content setting or wireless communication connection mode setting.

When a state of the master identity device is switched from an available state to an unavailable state, the processor may transmit an unavailability notification message indicating that the master identity device is in the unavailable state to the first slave identity device.

A state of the first slave identity device, which has received the unavailability notification message, may be set to an unavailable state regardless of a current state of the first slave identity device.

When a state of the master identity device is switched from an unavailable state to an available state, the processor may transmit an availability notification message indicating that the master identity device is in the available state to the first slave identity device.

A state of the first slave identity device, which has received the availability notification message, may be set in consideration of a current state of the first slave identity device.

The processor may receive, from the at least one slave identity device, an unavailability notification message indicating that a state of the first slave identity device has been switched from an available state to an unavailable state, and update state information of the first slave identity device.

The processor may transmit recovery information message to the first slave identity device, and the first slave identity device, which has received the recovery information message, may determine whether to switch the state of the first slave identity device to the available state.

The processor may receive a recovery response message from the first slave identity device, and the recovery response message may be information indicating whether the state of the first slave identity device has been switched to the available state.

The recovery information message may be periodically transmitted to the first slave identity device until the recovery response message is received.

The master identity device may be an embedded subscriber identity module (SIM) installed in the moving object, and the at least one slave identity may be a detachable SIM.

According to another embodiment of the present disclosure, a method of using a user device having a slave identity device applied thereto, including receiving a link request message from a master identity device, transmitting a link response message to the master identity device, and receiving a link permission message indicating link permission from the master identity device, wherein a moving object, in which the master identity device is installed, is controlled based on the master identity device or the slave identity device.

The user device may have authority to access a service performed based on the moving object.

The user device may include at least one of another moving object different from the moving object, a smartphone, a tablet PC, a laptop, a smartphone, an Internet of Things (IOT) device, a navigation device, a wearable device or a body insert chip.

The service performed based on the moving object may include at least one of a network access service performed using a network equipment provided in the moving object or a service performed using software provided in the moving object.

The slave identity device may have limited authority to control a moving object compared to the master identity device.

Operation of the moving object capable of being controlled by the slave identity device may include at least one of position or height setting of a seat excluding a driver's seat, indoor lighting color setting, indoor lighting brightness setting, setting of an air conditioner including an inside temperature, navigation setting, TV and radio setting, content setting or wireless communication connection mode setting.

The method of using the user device may further include receiving an unavailability notification message indicating that the state of the master identity device has been switched from an available state to an unavailable state, from the master identity device.

The method of using the user device may further include, when the unavailability notification message is received, setting a state of the slave identity device to the unavailable state regardless of the current state thereof.

The method of using the user device may further include receiving an availability notification message indicating that the state of the master identity device has been switched from an unavailable state to an available state, from the master identity device.

The method of using the user device may further include setting a state of the slave identity device in consideration of a current state thereof, when the availability notification message is received.

The method of using the user device may further include transmitting an unavailability notification message to the master identity device when a state of the slave identity device has been switched from an available state to an unavailable state.

The method of using the user device may further include receiving recovery information message from the master identity device and determining whether to switch the state of the slave identity device to the available state according to the recovery information message.

The method of using the user device may further include transmitting a recovery response message to the master identity device, and the recovery response message may be information indicating whether the state of the first slave identity device has been switched to the available state.

The recovery information message may be periodically received until the recovery response message is transmitted.

The master identity device may be an embedded subscriber identity module (SIM) installed in the moving object, and the at least one slave identity may be a detachable SIM.

According to another embodiment of the present disclosure, a user device having a slave identity device includes: a transceiver configured to transmit and receive a signal and a processor configured to control the transceiver. The processor is configured to receive a link request message from a master identity device of a moving object, transmit a link response message to the master identity device, and receive a link permission message indicating link permission from the master identity device. The user device is configured to receive and install the slave identity device of the moving object. The moving object, in which the master identity device is installed, is configured to be controlled by at least one of the master identity device or the slave identity device.

The user device may have authority to access a service performed based on the moving object.

The user device may include at least one of another moving object different from the moving object, a smartphone, a tablet PC, a laptop, a smartphone, an Internet of Things (IOT) device, a navigation device, a wearable device or a body insert chip.

The service performed based on the moving object may include at least one of a network access service performed using a network equipment provided in the moving object or a service performed using software provided in the moving object.

The slave identity device may have limited authority to control a moving object compared to the master identity device.

Operation of the moving object capable of being controlled by the slave identity device may include at least one of position or height setting of a seat excluding a driver's seat, indoor lighting color setting, indoor lighting brightness setting, setting of an air conditioner including an inside temperature, navigation setting, TV and radio setting, content setting or wireless communication connection mode setting.

The processor may receive an unavailability notification message indicating that the state of the master identity device has been switched from an available state to an unavailable state, from the master identity device.

The processor may set a state of the slave identity device to the unavailable state regardless of the current state thereof, when the user device receives the unavailability notification message.

The processor may receive an availability notification message indicating that the master identity device is in the available state, from the master identity device.

The processor may set a state of the slave identity device in consideration of a current state thereof, when the availability notification message is received.

The processor may transmit an unavailability notification message to the master identity device, when a state of the slave identity device has been switched from an available state to an unavailable state.

The processor may receive recovery information message from the master identity device and determine whether to switch the state of the slave identity device to the available state.

The processor may transmit a recovery response message to the master identity device, and the recovery response message may be information indicating whether the state of the first slave identity device has been switched to the available state.

The recovery information message may be periodically received until the recovery response message is transmitted.

The master identity device may be an embedded subscriber identity module (SIM) installed in the moving object, and the at least one slave identity may be a detachable SIM.

According to an embodiment of the present disclosure, provided is a method of operating a moving object having an identity device applied thereto, including receiving a link request message from a master identity device provided in another moving object different from the moving object, transmitting a link response message to the another moving object, and receiving a link permission message indicating link permission from the another moving object, wherein the identity device operates as a slave identity device for the master identity device of the another moving object.

According to an embodiment of the present disclosure, provided is a moving object having a identity device applied thereto, including a transceiver configured to transmit and receive a signal and a processor configured to control the transceiver, wherein the processor is configured to receive a link request message from a master identity device provided in another moving object different from the moving object, transmit a link response message to the another moving object, and receive a link permission message indicating link permission from the another moving object, wherein the identity device operates as a slave identity device for the master identity device of the another moving object.

According to an embodiment of the present disclosure, provided is a system including a moving object including a master identity device and at least one user device including a slave identity device, wherein the master identity device transmits a link request message to a first slave identity device included in the at least one user device, the first slave identity device transmits a link response message to the master identity device in response to the link request message, and the master identity device transmits a link permission message indicating link permission to the first slave identity device in response to the link response message, and wherein the moving object is controlled based on the master identity device or the first slave identity device.

BRIEF DESCRIPTION OF THE DRAWINGS

The above and other objects, features and other advantages of the present disclosure will be more clearly understood from the following detailed description taken in conjunction with the accompanying drawings, in which:

FIGS. 8A and 8B are flowcharts illustrating a method of performing authentication and link between identity devices, according to an embodiment of the present disclosure;

FIG. 12 is a view illustrating moving object control information stored in and managed by an identity device, according to an embodiment of the present disclosure;

DETAILED DESCRIPTION

Figure 1:
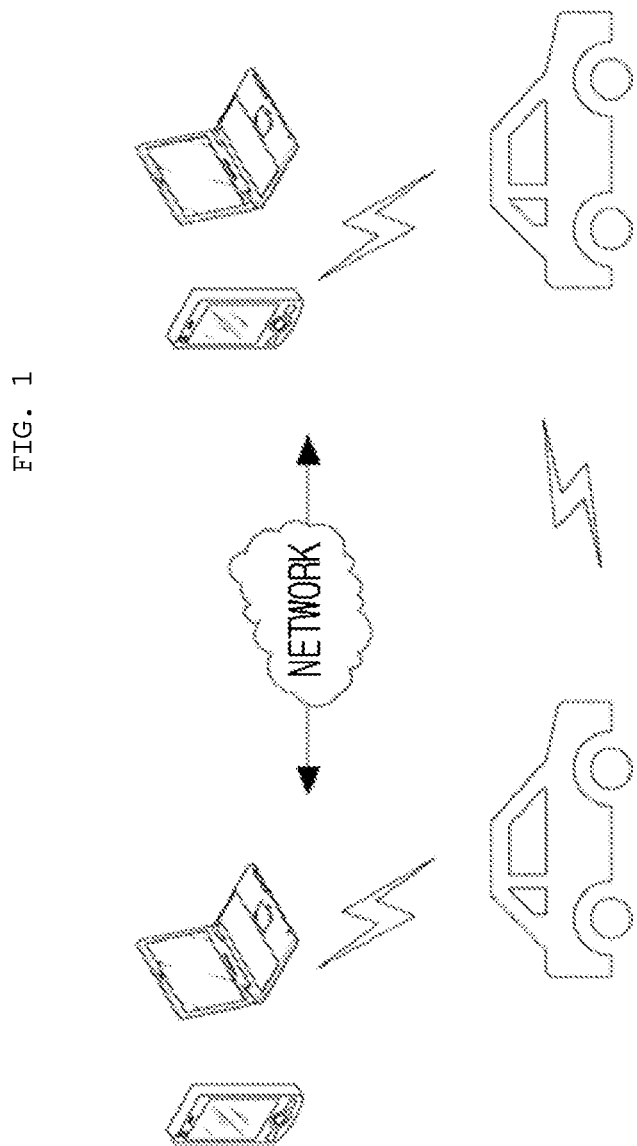
FIG. 1 is a view showing a method of, at a moving object, performing communication with other devices.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present disclosure and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the disclosure to those skilled in the art.

FIG. 1 is a view showing a method of, at a moving object, performing communication with another moving object or a device via a network. Referring to FIG. 1, the moving object may perform communication with another moving object or another device. For example, the moving object may perform communication with another moving object or another device based on cellular communication, WAVE communication, DSRC (Dedicated Short Range Communication) or other communication schemes. That is, as a cellular communication network, an LTE or 5G communication network, a Wi-Fi communication network, a WAVE communication network, etc. may be used. In addition, a short-range communication network used in a moving object, such as DSRC, may be used, without being limited to the above-described embodiments.

In addition, in relation to communication of the moving object, a module for performing communication only with a device located inside the moving object and a module capable of performing communication with a device located outside the moving object may be separately provided, for security of the moving object. For example, communication with a device in a certain range of the moving object, such as Wi-Fi communication, may be performed inside the mobile terminal, for security. For example, the moving object and a device privately owned by the driver of the moving object may include respective communication modules for performing only communication with each other. That is, the moving object and the device privately owned by the driver of the moving object may use a communication network disconnected from an external communication network. In addition, for example, the moving object may include a communication module for performing with an external device. In addition, the module may be implemented as one module. That is, the moving object may perform communication with another device based on one module, without being limited to the above-described embodiment. In the moving object, the communication method may be implemented based on various methods, without being limited thereto the above-described embodiment.

At this case, the moving object may refer to a movable device. For example, the moving object may include a vehicle (including an autonomous vehicle and an automated vehicle), a drone, a mobility, a mobile office, a mobile hotel, or a personal air vehicle (PAV). In addition, the moving object may include the other movable devices, without being limited to the above-described embodiments.

FIGS. 2A to 2D are views showing various methods of applying an identity device to a moving object.

For example, the identity device may have at least one of functions for identifying at least one of a user, an object to be controlled or a service object. In addition, for example, the identity device may have an ID function. In addition, for example, the identity device may include at least one of a smart device, a smart module, a user identification module or an identification module. That is, the identity device may be a hardware element. In addition, for example, the identity device may be a software element and may be used for identification. For example, the identity device may be a subscriber identity module (SIM). For example, the SIM applied to the moving object as the identity device may be at least one of a Mobility SIM (M-SIM), a Vehicle SIM (V-SIM), an Embedded SIM (E-SIM) or a nano SIM. In addition, for example, the identity device may be equal to or compatible with an existing SIM, without being limited to the above-described embodiment. Although the identity device is focused upon in the following description, this may be replaced by a smart module, a user module, a SIM, etc., without being limited thereto. However, for convenience of description, the identity device will be focused upon in the following description. As described above, the identity device may be applied to the moving object in consideration of the case where the moving object performs communication with an external device. A smartphone may recognize the user of the smartphone through a universal subscriber identity module (USIM) and provide a service. For example, when an apparatus is compatible with the same brand or the identity device, only the identity device of the user may be changed to identify the user of the apparatus and a service may be provided based on the same. The moving object may also include an identity device embedded therein, based on the above description. The identity device applied to the moving object may be referred to as a vehicle SIM (VSIM). That is, a new type of identity device may be applied as the identity device applied to the moving object. For example, the VSIM may be compatible with a USIM or another SIM. In addition, the VSIM may further provide other services in consideration of the characteristics of the moving object, without being limited to the above-described embodiment. In addition, an identity device card applied to the moving object may be provided and may be referred to as another name, without being limited to the above-described embodiment.

Figure 2A:
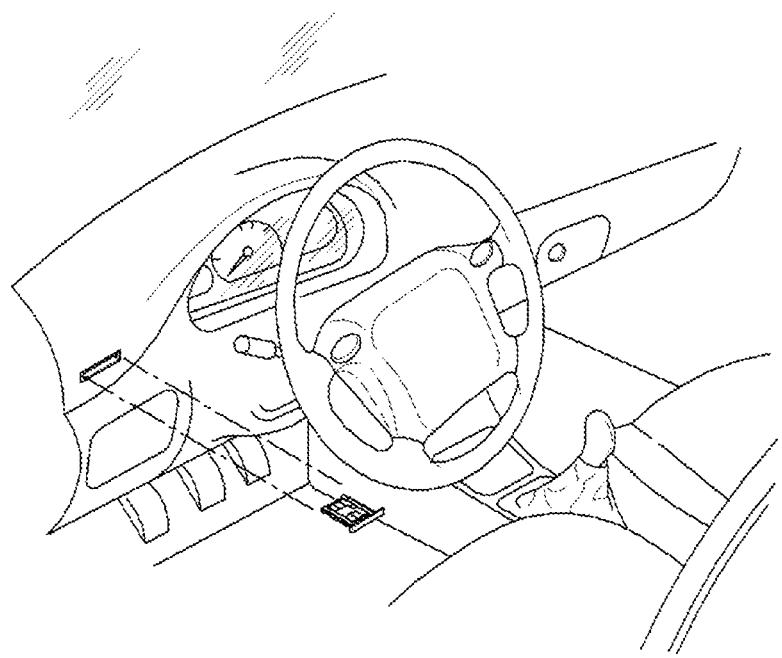
FIGS. 2A, 2B, 2C and 2D are views showing various methods of applying an identity device to a moving object.
Figure 2B:
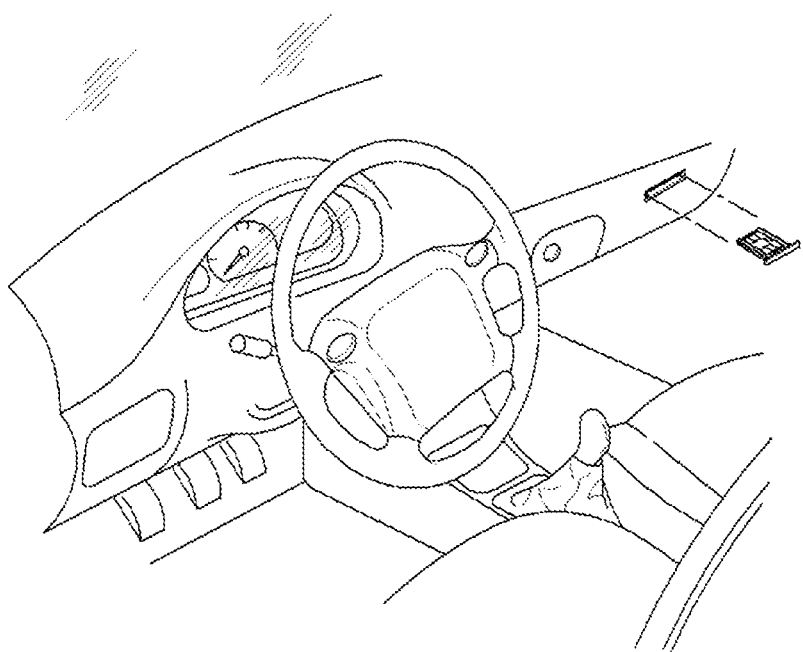

For example, referring to FIGS. 2A to 2D, a part, to which the identity device is applicable, may be located in the moving object. FIGS. 2A to 2D shows an example of applying the identity device, without being limited to the above-described embodiment. More specifically, as shown in FIG. 2A, a part, to which the identity device is applied, may be located in a part, which is capable of being visually identified, of the driver's seat of the moving object. As another example, as shown in FIG. 2B, the identity device may be applied to the inside of the glove box of the passenger seat of the moving object. In addition, the identity device may be inserted into a part in which the display of the moving object is located, without being limited to the above-described embodiment.

Figure 2C:
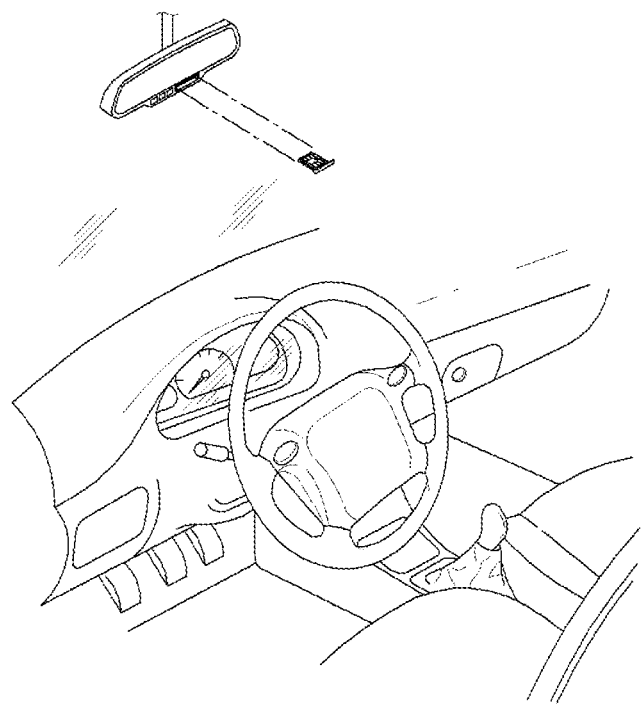
Figure 2D:
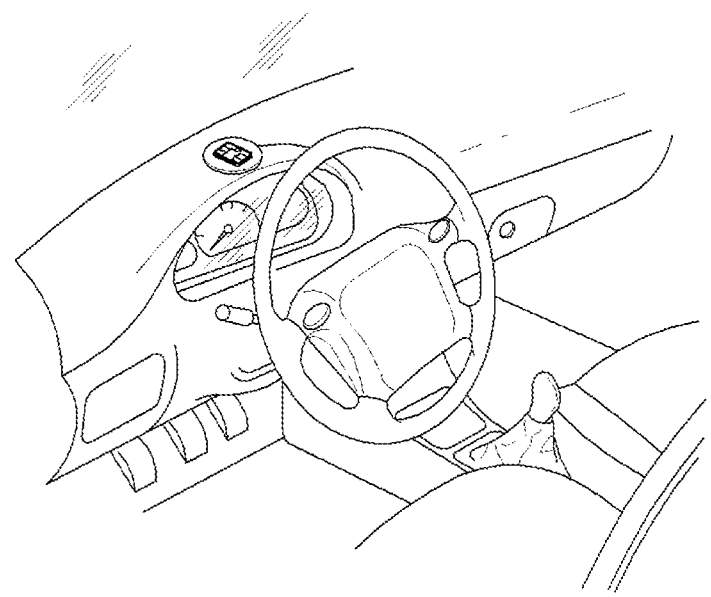

As another example, as shown in FIG. 2C, the identity device may be installed in a room mirror of the moving object. For example, since the room mirror of the moving object is easily accessible to the passenger while affecting traveling of the moving object or the other devices of the moving object, the identity device may be installed in the room mirror of the moving object. As another example, as shown in FIG. 2D, the identity device may be installed in a cradle or a pad. For example, when the moving object is controlled by the identity device, a large number of cases of replacing the identity device for each user may occur. In view of the foregoing, in order to enhance convenience of installing the identity device, the identity device may be installed in the cradle or the pad and used to control the moving object. For example, the identity device may be installed in the cradle or the pad based on the magnetic properties. In addition, for example, the identity device may be installed in the cradle or the pad based on another manner, without being limited to the above-described embodiment.

As another example, the identity device may be implemented in combination with a tool key or a car key in consideration of the portability of the identity device. That is, the identity device may be installed in the tool key or the car key, the identity device detached from the car key may be used in a state of being installed in the moving object. For example, a USIM or an identity device similar thereto may have a small size. In addition, the identity device has a portion which is in contact with the moving object and thus there is a need for preventing damage to the contact portion. In view of the foregoing, the identity device may be coupled to the car key or the tool key. As another example, the car key or the tool key itself may be an identity device. That is, each user may own their car key or tool key as the identity device, and may control the moving object using the same. For example, when the car key or the tool key is an identity device, the car key or the tool key may be installed in the moving object. In addition, the car key or the tool key may perform communication with the moving object via short-range communication (e.g., Bluetooth, beacon or NFC), thereby performing message exchange or identification. That is, the car key or the tool key, to which the uniqueness of an individual is applied, may be used as the identity device, without being limited to the above-described embodiment.

As another example, the identity device may be installed through an existing device installed in the moving object. For example, an existing device (e.g., a hi-pass terminal or a black box) may be already installed in the moving object. At this time, if a separate installation portion is configured in the moving object in order to install the identity device, since equipment for the moving object needs to be changed and a component or part for additional installation may be necessary, the existing device may be used in order to install the identity device. That is, a component in which the identity device may be installed may be added to the existing device already installed in the moving object and the identity device may be installed in the component based on the same. As another example, the identity device may be recognized through an existing terminal (e.g., a USB port, or a cigar jack) included in the moving object.

As another example, the identity device may be applied at any position in an authenticable range of the moving object, and the identity device may be applied integrally with or independently of a control unit, a communication unit or a configuration part of the moving object. At this time, a plurality of identity devices may be installed or provided in the above-described parts.

More specifically, the moving object may include a separate installation portion for installation of the identity device or a part in which the identity device is installed. That is, the identity device may be installed in the moving object in a state of being separated from the other parts, as one independent part. As another example, the identity device may be installed in the moving object to be included in at least one of the control unit, the communication unit or the other unit, as described above. For example, in the moving object, the control unit or the communication unit may perform communication with an external device or control information. At this time, the identity device may provide necessary information to the control unit and the communication unit or enable the control unit and the communication unit to operate through identification and authentication. That is, the identity device may be closely related to the control unit or the communication unit and thus may be installed in the moving object in combination with the above-described units. The identity device may be installed in the moving object integrally with the other units. As another example, the identity device may be implemented as an identity device embedded in the moving object. The embedded identity device may be physically implemented in the moving object or may be implemented in software in the moving object operation and design process, without being limited to the above-described embodiment.

In addition, all a plurality of identity devices implemented in the moving object may be embedded identity devices. More specifically, the plurality of identity devices are not installed through a separate installation unit, but may be embedded identity devices implemented in the moving object in hardware or software. For example, the plurality of embedded identity devices may be implemented for each user. In addition, for example, the plurality of embedded identity devices may be used to separate each system in the moving object, without being limited to the above-described embodiment. That is, the plurality of identity devices may be implemented in the moving object in the form of embedded identity devices. In addition, detailed operation will be described below based on the above description.

For example, the equipment of the moving object is changed or an additional component is installed in order to install the identity device, cost may increase. In view of the foregoing, the identity device may be installed (or recognized) through an existing terminal included in the moving object. Therefore, the identity device may be easily applied to the existing moving object, without being limited to the above-described embodiment.

At this time, when the identity device is applied to the moving object, the moving object may perform subscriber identification based on the identity device. That is, similarly to a smartphone, the moving object may identify the user of the moving object based on the identity device. At this time, the identity device may include user environment information such as driving record information of a user, navigation setting information, moving object setting information, driver's seat information, steering information. That is, by applying the identity device to the moving object, it is possible to establish a system based on information on use of the moving object. In addition, for example, when the identity device is not applied to the moving object, the moving object may not operate. For example, the moving object may operate only when the identity device is applied and recognized. However, some driving may be possible in consideration of emergency.

For example, as described above, when the identity device is not identified and authenticated in the moving object, the control authority of the moving object may not be granted. In the case where the moving object is a vehicle, in the past, the vehicle may be immediately controlled when the vehicle is turned on. However, when the identity device is applied, the vehicle may be controlled by the user only when the vehicle is turned on and identification and authentication of the identity device is completed.

More specifically, the moving object may operate based on full autonomous driving. In addition, for example, the moving object may perform communication with other devices via a communication network and operate based on information received through communication. However, in the moving object, a plurality of operations and functions may be defined for the purpose of movement. When identification and authentication are not guaranteed, a security problem or a risk of an accident may occur. In view of the foregoing, the moving object may be turned on differently from the existing method and may be controlled when identification and authentication are performed based on the identity device.

As another example, the identity device may operate regardless of whether the moving object is turned on. The moving object may include devices for supplying power to the other existing devices, such as a black box. At this time, the identity device may operate by receiving power from the moving object. As another example, the identity device may provide power and operate by itself. In addition, for example, the identity device may supply power and operate based on a separate charging device such as wireless charging or solar charging. At this time, the operation of the identity device may not require large power consumption and may operate regardless of whether the moving object is turned on. The identity device may operate by receiving power from the moving object or by supplying power by itself. That is, the identity device may operate regardless of whether the moving object is turned on, without being limited to the above-described embodiment. At this time, for example, even when the moving object is turned on, the identity device may perform identification and authentication. In order to trigger the identity device when the moving object is not turned on, identification and authentication may be performed when the personal device of the owner of the moving object is recognized. As another example, even if the moving object is not turned on, identification and authentication of the identity device may be performed when it is recognized that the driver or another user rides in the moving object, without being limited to the above-described embodiment. That is, even if the moving object is not turned on, the identity device may operate, without being limited to the above-described embodiment.

At this time, in view of the foregoing, it is possible to prevent the identity device from being arbitrarily removed from the moving object. More specifically, as described above, the risk of security and accidents may be high in the case of the moving object. In addition, as described above, when the identity device is arbitrarily detached while operation is performed based on the identity device, the risk of accidents may occur based on authentication error. In view of the foregoing, it is possible to prevent the identity device from being arbitrarily detached. For example, before the moving object is turned on, the identity device may be arbitrarily attached and detached. That is, when the moving object does not operate, attachment/detachment of the identity device may not be locked. Accordingly, a user who wants to use the moving object may replace the identity device before the moving object is turned on, and use an identity device suitable for the user.

Figure 3A:
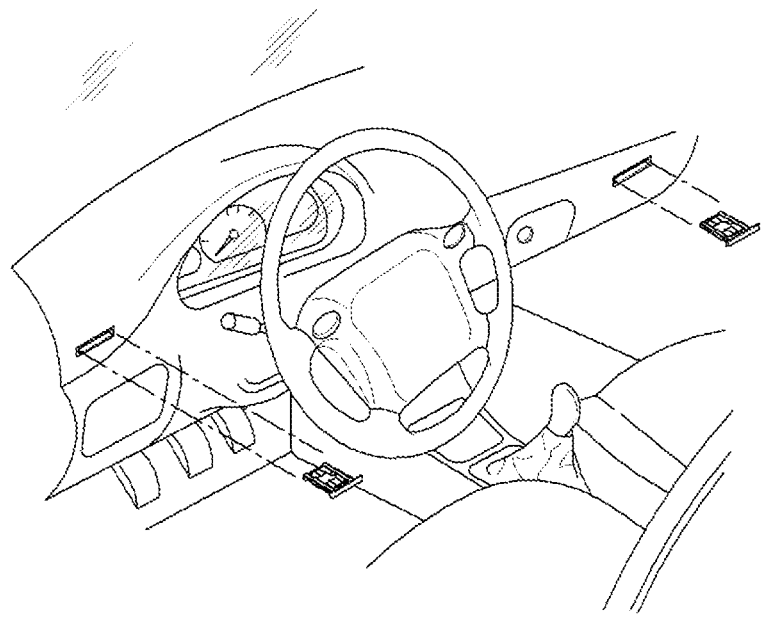
FIG. 3A to 3B are views showing various methods of embedding a plurality of identity devices in a moving object.
Figure 3B:
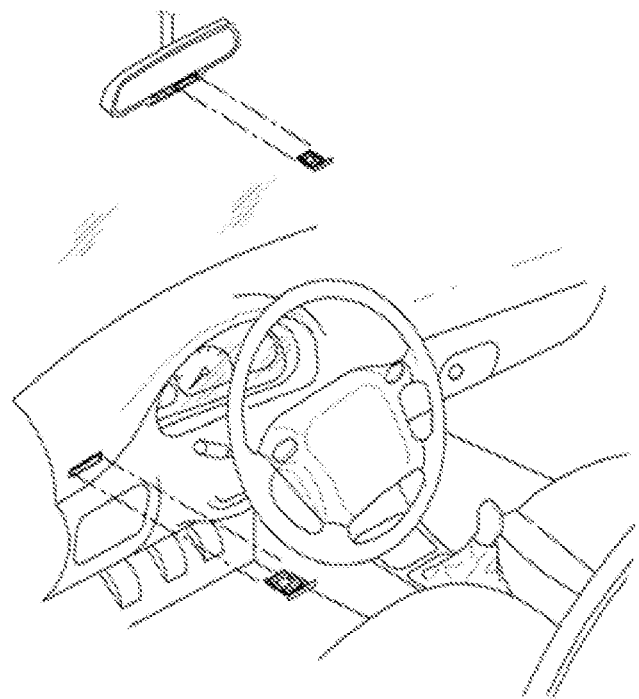

In addition, referring to FIGS. 3A and 3B, a plurality of identity devices may be installed in the moving object. The plurality of identity devices may be installed in the moving object based on respective positions. At this time, for example, the positions at which the plurality of identity devices is installed may be variously set, and the installation positions are not limited to FIGS. 3A and 3B. That is, the plurality of identity devices may be installed in the moving object to perform individual identification and authentication. At this time, a plurality of identity devices may be installed or provided at each position.

In addition, for example, some of the plurality of identity devices may be embedded and the other identity devices may be installed. At this time, the embedded identity device is implemented physically or in software in the moving object. For example, the embedded identity device may be the above-described embedded SIM. That is, the embedded entity device may be an identity device implemented inside the moving object, without being limited thereto. The installed identity device may be an external identity device. The external identity device may be detached from the moving object by the driver or the user, as described above. When the plurality of identity devices is applied to the moving object, the identity device may be installed or implemented in the moving object in various ways, without being limited to the above-described embodiment.

For example, when the moving object is used, the moving object may perform identification and authentication with respect to the user through an identity device and operate based on the identity device of the user. At this time, for example, the user may be identified and authenticated through a camera included in the moving object. As another example, the user may be identified and authenticated based on fingerprint identification or a separate authentication key. That is, each user may register their fingerprint or may be assigned a separate authentication key (e.g., a password) and then may be identified and authenticated through the fingerprint or the separate authentication key when using the moving object. As another example, identification and authentication of the user may be performed through at least one of fingerprint recognition, iris recognition, facial recognition, moving object head unit input, FOB key, electronic key, Internet advance reservation, another device, a server or a mobile device. That is, the moving object may identify and authenticate each user, without being limited to the above-described embodiment. In addition, for example, when the identity device is installed, the moving object may identify and authenticate a user based on information stored in the identity device. That is, when the identity device is installed without additional identification and authentication, the moving object may identify and authenticate a user corresponding to the identity device and operate based on this.

At this time, as another example, operation of installing an identity device may be restricted in order to prevent an unauthorized identity device from being installed in the moving object without permission. More specifically, the moving object may perform authentication based on wireless communication with the identity device or the device of the user who uses the identity device. That is, authentication for allowing installation of the identity device may be performed before the identity device is installed, thereby preventing the identity device from being installed without permission. For example, the identity device installation unit of the moving object may be opened until authentication, and may be opened when installation in the identity device itself or the device of the user is allowed through pre-authentication. At this time, the moving object may identify and authenticate the user by only installing the identity device, and operate based on this, without being limited to the above-described embodiment.

At this time, when the moving object identifies and authenticates the user, the moving object may operate based on the identity device corresponding to the identified and authenticated user. For example, the moving object may store and update information on use or driving of the moving object in the identity device based on the user. In addition, setting information for the user may be stored in the identity device. At this time, when the moving object recognizes the user, the setting of the moving object may be changed based on the setting information included in the identity device.

When the moving object is turned on, arbitrary detachment of the identity device may be prohibited. That is, detachment of the identity device may be locked. Through the foregoing, it is possible to prevent an accident due to detachment of the identity device while the moving object is driven. At this time, for example, even when the moving object is turned on, lock for detachment may be changed depending on whether the moving object is driven. For example, even when the moving object is turned on, if the moving object is not driven, the identity device may be detached after authentication of a separate device. For example, the separate device may be a smart device. At this time, a user may perform authentication for detachment of the identity device through the smart device and provide information thereon to the moving object, thereby obtaining authority for detachment of the identity device. Thereafter, detachment of the identity device may be unlocked, and, when the identity device is detached from the moving object, the moving object may be turned off. Thereafter, when another identity device is embedded, operation may be performed based on the another identity device. In contrast, when the moving object is turned on and the moving object is being driven, although authentication of another device is performed, detachment of the identity device may be impossible. For example, which the moving object is being driven, the moving object may be driven by exchanging information with an external device through autonomous driving or communication and, when the identity device is arbitrarily detached, an accident may occur. Therefore, in order to prevent this, arbitrary detachment may be prevented.

Figure 4:
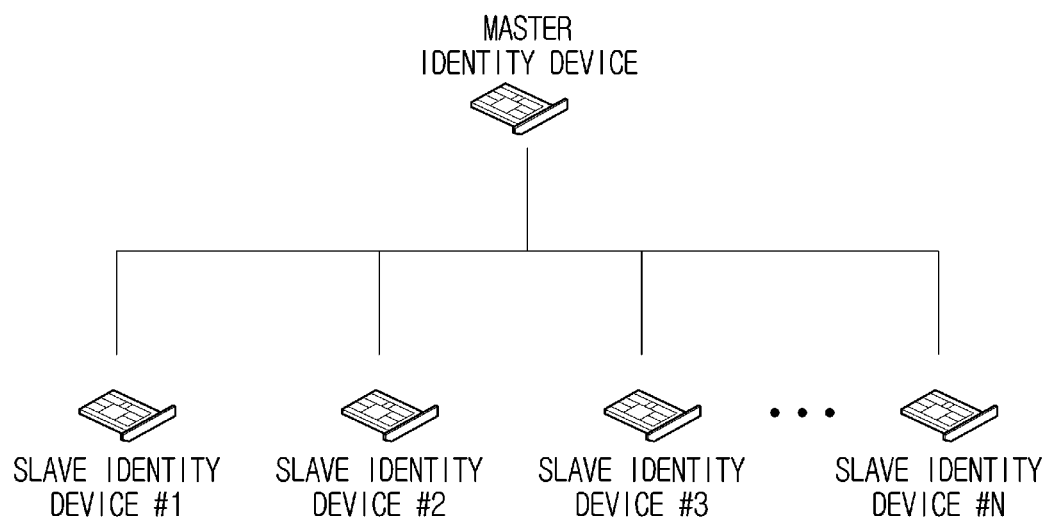
FIG. 4 is a view showing a method of, at a master identity device, managing a plurality of slave identity devices, according to an embodiment of the present disclosure.

FIG. 4 is a view showing a method of, at a master identity device, managing a plurality of slave identity devices, according to an embodiment of the present disclosure.

According to the above-described embodiment, a driver may obtain control authority for the moving object and service access authority performed based on the moving object through the identity device. It may be assumed that a passenger other than a driver (hereinafter referred to as a passenger) rides in the moving object. In this case, the passenger other than the driver may need to obtain control authority for the moving object and the service access authority performed based on the moving object. For example, when the passenger wants to receive a network service based on the moving object, the moving object may require additional authentication for the passenger. In this case, the passenger other than the driver may perform authentication with respect to the moving object through the slave identity device.

For example, the moving object according to the present disclosure may include a plurality of identity devices. At this time, the plurality of identity devices may include one master identity device and one or more slave identity devices. The master identity device and the slave identity device may have a dependent relationship. For example, the driver may be authenticated by the master identity device. The driver may perform authentication using at least one of the various embodiments and obtain, based on this, the control authority for the moving object and the service access authority performed based on the moving object. As another example, the driver may obtain the control authority for the moving object using the master identity device, and obtain the service access authority performed based on the moving object using the slave identity device.

The passenger other than the driver may be authenticated by the slave identity device. The method of performing authentication with respect to the passenger other than the driver at the slave identity device may be equal to the method of authenticating the driver at the master identity device.

The master identity device and the slave identity device according to the present disclosure may be linked to each other. The link between the master identity device and the slave identity device will be described in detail with reference to FIG. 8A.

In addition, operation of the slave identity device may depend on the master identity device. Operation according to the dependent relationship between the master identity device and the slave identity device will be described in detail with reference to FIGS. 9 to 11.

Figure 5:
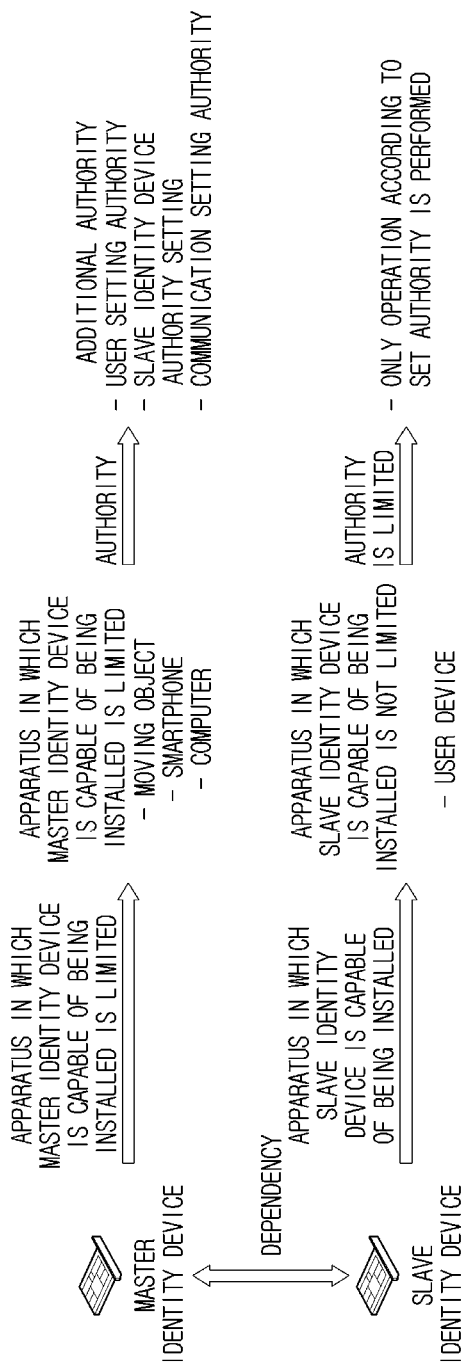
FIG. 5 is a view illustrating a difference in authority and function between a master identity device and a slave identity device, according to an embodiment of the present disclosure.

FIG. 5 is a view illustrating a difference in authority and function between a master identity device and a slave identity device, according to an embodiment of the present disclosure.

As shown in FIG. 5, the master identity device and the slave identity device according to the present disclosure are different in installable device and authority.

For example, a device in which the master identity device may be installed may be limited compared to the slave identity device. Specifically, the device in which the master identity device may be installed may be limited to a device capable of providing an independent service to a user. As described below, since a user device in which the slave identity device is installed may receive a service through a device in which the master identity device is installed, the device in which the master identity device may be installed may be limited to the device capable of providing the independent service to the user. For example, the device in which the master identity device may be installed may be at least one of a moving object, a smartphone, a tablet, a laptop or a PC, which operate by an independent communication protocol. On the other hand, the device in which the slave identity device may be installed may be one of all apparatuses which may operate by dependently receiving services from a device, to which the master identity device is applied, as well as a device, to which the master identity device may be applied. For example, the slave identity device may be installed in at least one of a moving object, a tablet, a laptop, a PC, a smartphone, a smart watch, an IOT device, a navigation device, a wearable device or a body insert chip, which includes a communication but is not controlled by an independent communication protocol, in addition to the above-described moving object, smartphone, tablet PC, laptop and PC. Hereinafter, the device in which the slave identity device is installed is collectively referred to as a user device.

When the device in which the master identity device is installed is a smartphone and the user device in which the slave identity device is installed is a tablet PC which is not controlled by an independent communication protocol, the tablet in which the slave identity device is installed may receive a network service using the network of the smartphone in which the master identity device is installed.

For convenience, although, in the present specification, the master identity device is described as being applied to the moving object, this is only an example and the master identity device according to the present disclosure may be installed in one of the above-described apparatuses.

The slave identity device may have limited authority compared to the master identity device. The authority are limited because operation of the user device, in which the slave identity device is installed, and service provision are controlled by the master identity device. For example, the master identity device may further include at least one of user setting authority of the master identity device and the slave identity device, authority setting rights of the slave identity device or communication setting authority of the user device compared to the slave identity device. The slave identity device may have authority such as user verification authority set by the master identity device and operation authority for the user device.

Figure 6:
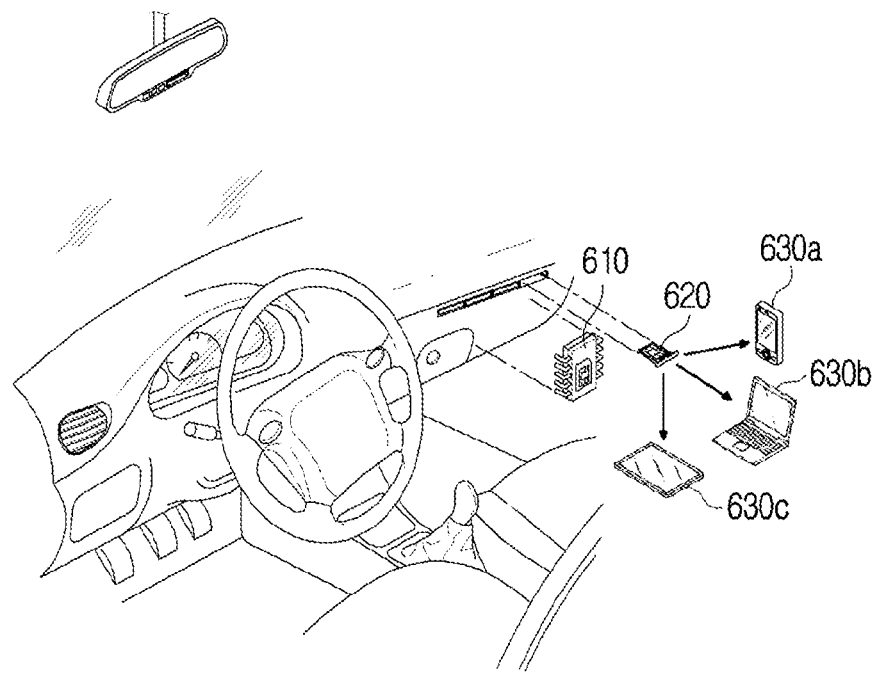
FIG. 6 is a view showing a method of applying a master identity device and a slave identity device to a moving object, according to an embodiment of the present disclosure.

FIG. 6 is a view showing a method of applying a master identity device and a slave identity device to a moving object, according to an embodiment of the present disclosure.

As shown in FIG. 6, the moving object may include a master identity device 610 and a plurality of slave identity devices 620. For example, the master identity device provided in the moving object may be an e-SIM installed in the moving object, and the slave identity device may be one of detachable SIMs. A driver may obtain the control authority for the moving object and the service access authority performed based on the moving object, using the master identity device, to which at least one of the above-described embodiments is applied.

A user who has obtained the control authority for the moving object may control operation related to driving of the moving object. The control operation related to driving of the moving object will be described in detail below. For example, the service performed based on the moving object may include a network access service performed using a network equipment provided in the moving object, a service performed using software provided in the moving object, etc. For example, the service performed using software provided in the moving object may include navigation, DMB, TV, radio, CD, DVD and moving image playback. The service using software provided in the moving object may include, for example, all programs for increasing user convenience using software provided in the moving object.

The passenger other than the driver may obtain the service access authority performed based on the moving object using the slave identity device 620. For example, the passenger may install the slave identity device 620 provided in the moving object in user devices 630a, 630b and 630c. The user devices 630a, 630b and 630c in which the slave identity device 620 is installed may obtain the control authority for the moving object and the service access authority performed based on the moving object. For example, when the moving object has an independent network access function, the user devices 630a, 630b and 630c in which the slave identity device is installed may receive network services using the network of the moving object. In addition, the passenger may control operation of the moving object using the user devices 630a, 630b and 630c in which the slave identity device is installed.

At this time, since the passenger obtaining the control authority of the moving object related to driving may cause an accident, the control authority for the moving object provided by the slave identity device may be limited compared to the control authority of the moving object provided by the master identity device. For example, the passenger may perform seat position setting, seat height setting, indoor lighting color setting, indoor lighting brightness setting, air conditioner setting including inside temperature, navigation setting, TV and radio setting, content setting, wireless communication connection mode settings, etc., but may not perform operation such as steering wheel control, autonomous driving variable setting, room mirror, rearview mirror, side view mirror position and angle setting, driver's seat position setting, driver's seat height setting, wiper setting, transmission setting mode, instrument panel and other setting related to driving, using the user devices 630a, 630b and 630c in which the slave identity device is installed. The function of the moving object which may be controlled by the slave identity device is an example, the slave identity device may have authority for controlling the operation of the moving object, which does not interfere with driver's operation of the moving object.

Figure 7:
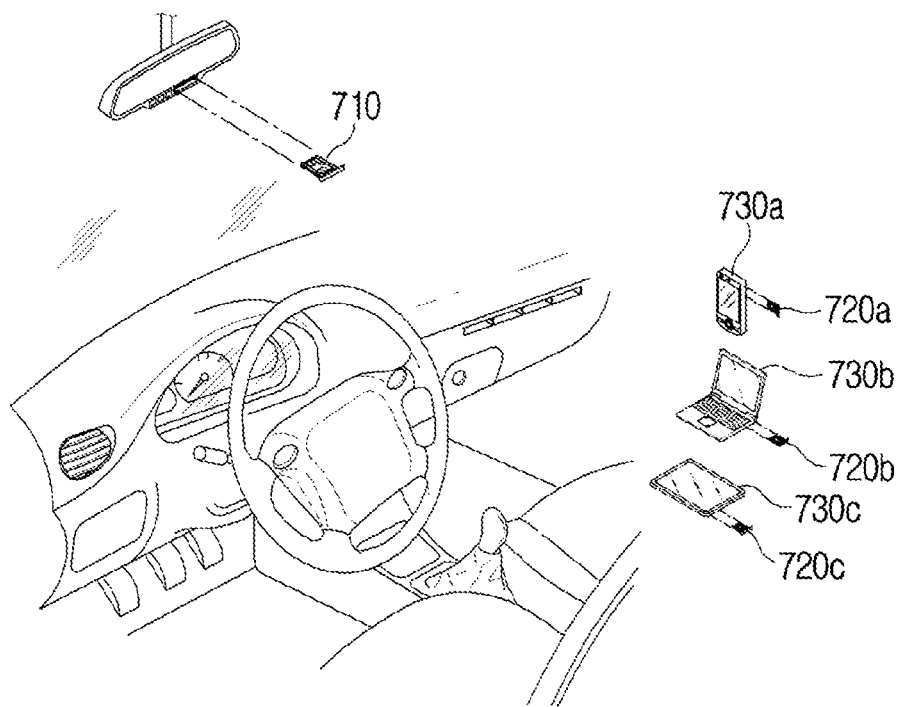
FIG. 7 is another view showing a method of applying a master identity device and a slave identity device to a moving object, according to an embodiment of the present disclosure.

FIG. 7 is another view showing a method of applying a master identity device and a slave identity device to a moving object, according to an embodiment of the present disclosure.

As shown in FIG. 7, the moving object according to another embodiment of the present disclosure may include only a master identity device 710. In this case, the master identity device 710 may authenticate identity devices 720a, 720b and 720c respectively installed in user devices 730a, 730b and 730c of the passenger and give, to the passengers, the control authority for the moving object and service access authority based on the moving object. That is, when the moving object includes only the master identity device 710, the identity devices 720a, 720b and 720c installed in the user devices of the passenger may operate as the slave identity device, thereby setting the control authority for the moving object and service access authority based on the moving object. When the identity devices 720a, 720b and 720c respectively installed in the user devices 730a, 730b and 730c of the passenger operate as the slave identity devices according to the present disclosure, the passenger may not install a separate identity device in the user device, the passenger may more conveniently obtain the control authority for the moving object and service access authority based on the moving object.

As shown in FIG. 7, the master identity device may also be detached. The method of applying the master identity device and the slave identity device to the moving object is not limited to the embodiments shown in FIGS. 6 and 7, and at least one of various embodiments, in which the identity device described in FIGS. 2 and 3 is applied to the moving object, may be used.

As another example, the master identity device may operate as the slave identity device for another master identity device through authority setting change. The master identity device of a first moving object may operate as the slave identity device of a second moving object. In this case, the driver or the passenger of the first moving object may obtain access authority for a service performed based on the second moving object. For example, when the second moving object has an independent network access function, the first moving object may receive a network service using the network of the second moving object. Even when the master identity device provided in the first moving object operates as the slave identity device of the second moving object, the driver or the passenger of the first moving object may obtain only the access authority for the service performed based on the second moving object. That is, even when the master identity device of the first moving object operates as the slave identity device of the second moving object, the driver or the passenger of the first moving object may not obtain the control authority for the second moving object. This is to prevent operation of the moving object from being controlled by a person who is not inside the moving object while the moving object is driven.

Figure 8B:
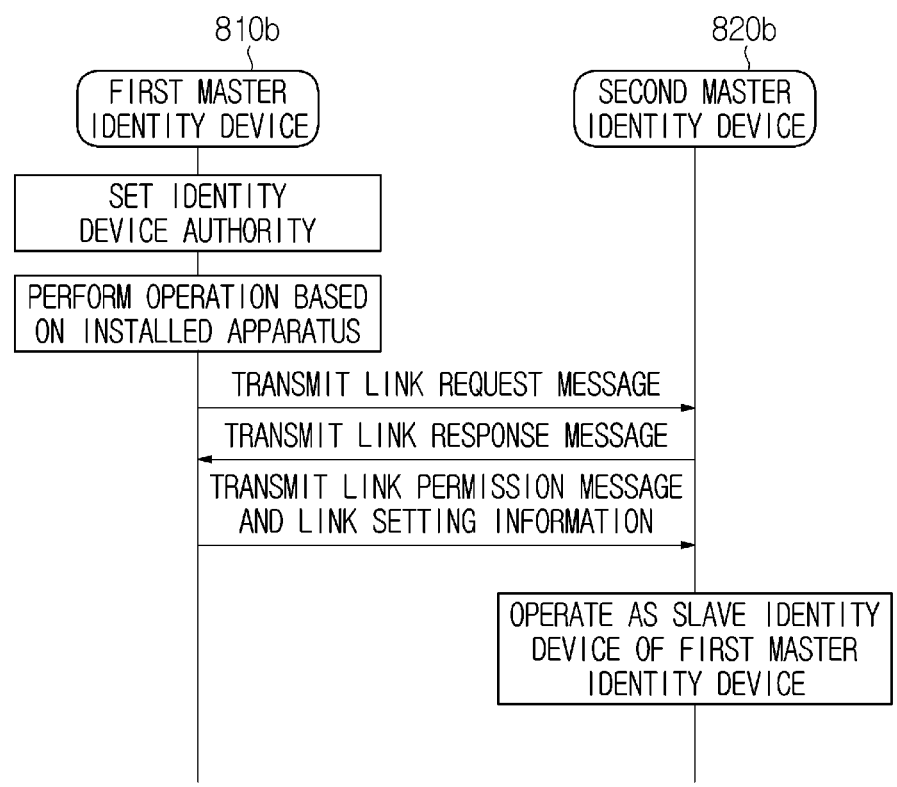

FIGS. 8A and 8B are flowcharts illustrating a method of performing link between identity devices, according to an embodiment of the present disclosure.

FIG. 8A is a view showing a method of performing link between the master identity device and the plurality of slave identity devices. At this time, a first slave identity device 820a and a second slave identity device 830a may be the slave identity devices respectively installed in different user devices.

As shown in FIG. 8A, the authority of the master identity device described in FIG. 5 may be set in a master identity device 810a. The master identity device 810a may perform operation based on an installed apparatus and authority.

The master identity device 810a, which has recognized the slave identity devices 820a and 830a, may transmit a link request message to the slave identity devices 820a and 830a. Specifically, the master identity device may transmit the link request message to each of the plurality of slave identity devices 820a and 830a. The plurality of slave identity devices 820a and 830a, which has received the link request message, may transmit a link response message to the master identity device 810a in response to the link request message. The link response message may indicate link permission with respect to the link request message of the master identity device 810a. The master identity device 810a, which has received the link response message from each of the plurality of slave identity devices 820a and 830a, may transmit a link permission message and link setting information to the plurality of slave identity devices 820a and 830a. At this time, the link permission message may indicate whether link is permitted, and the link setting information may include at least one of information indicating authority given to each of the plurality of slave identity devices 820a and 830a and basic information necessary to perform the service provided by the master identity device.

The plurality of slave identity devices 820a and 830a, which has received the link permission message and the link setting information from the master identity device 810a, may perform operation based on information received by the plurality of slave identity devices 820a and 830a. For example, when an apparatus in which the master identity device 810a is installed is a moving object and a user device in which the first slave identity device 820a is installed is a smartphone, the user of the smartphone may receive a network service using a network environment provided by the moving object or perform operation of the moving object using the smartphone.

FIG. 8B is a view illustrating a method of operating a master identity device provided in a moving object as a slave identity device for another master identity device through setting change, according to the above example.

In FIG. 8B, the master identity device provided in the moving object may operate as the slave identity device of the master identity device provided in another moving object. For example, a first master identity device 810b may be provided in the first moving object, and a second master identity device 820b may be provided in the second moving object. The method of linking the first master identity device 810b and the second master identity device 820b to each other may be equal to the method of linking the master identity device 810a and the plurality of slave identity devices 820a and 830a described in FIG. 8A. The first master identity device 810b and the second master identity device 820b may be linked using at least one of the above-described link request message, link response message or link setting information. The second master identity device 820b, which has received the link permission message from the first master identity device 810b, may operate as the slave identity device of the first master identity device 810b. That is, the first moving object may obtain the control authority for the second moving object. At this time, the control authority for the second moving object obtainable by the first moving object has been described above.

Figure 9:
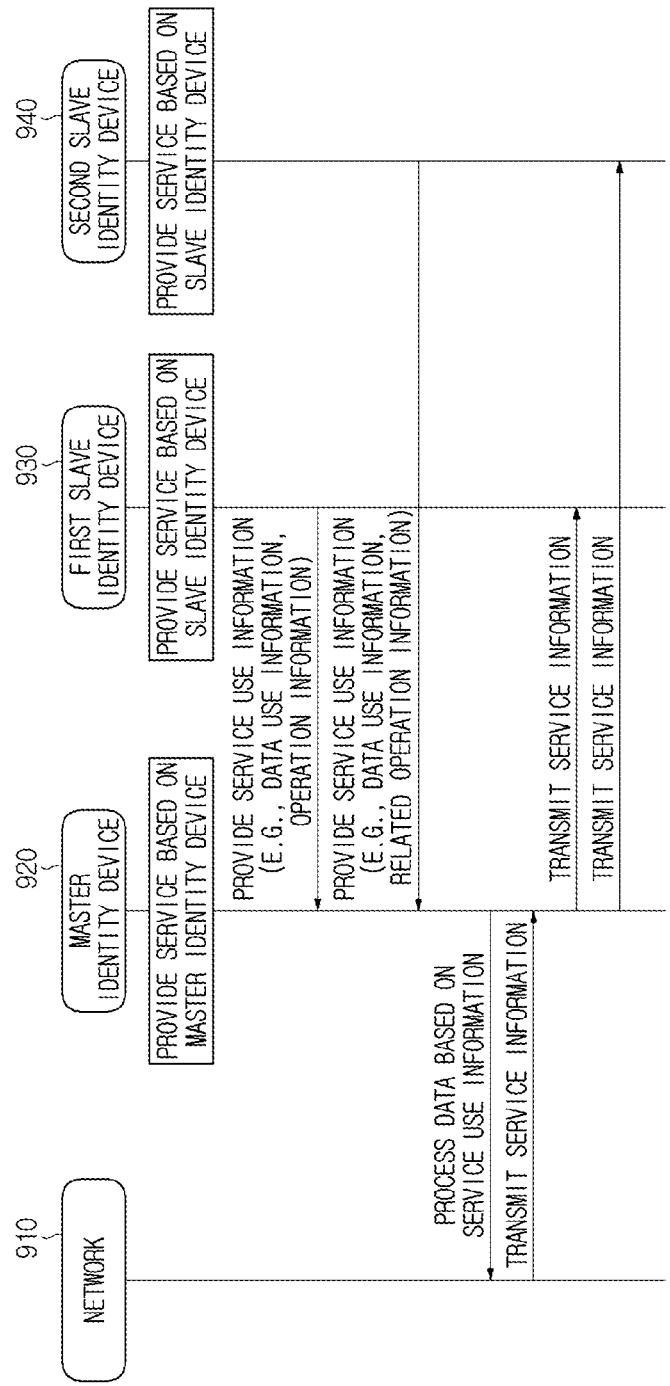
FIG. 9 is a flowchart illustrating a method of providing a service between identity devices, according to an embodiment of the present disclosure.

FIG. 9 is a flowchart illustrating a method of providing a service between identity devices, according to an embodiment of the present disclosure.

A master identity device 920 and a plurality of slave identity devices 930 and 940 linked according to the embodiment of FIG. 8A may provide a service necessary for a user (a driver or a passenger) based on the apparatus in which each identity device is installed. Each of the slave identity devices 930 and 940 may transmit service use information necessary for service provision to the master identity device. Here, the service use information may include at least one of information necessary for the apparatus, in which the slave identity device is installed, to receive a network service, apparatus operation information for network service provision, or information generated according to network service provision.

The master identity device 920 may receive the service use information from the plurality of slave identity devices 930 and 940, perform data processing based on this, and provide a result of performing data processing to a network 910 (or a server). The network 910 may receive the data from the master identity device 920, and transmit information for each identity device to perform the service to the master identity device 920. Hereinafter, information required for each identity device to provide the service to the user is defined as service information. The master identity device 920, which has received the service information from the network 910, may transmit service information to the slave identity devices 930 and 940. Each of the slave identity devices 930 and 940 may provide a necessary service to the user of the apparatus using the received service information.

In FIG. 9, each of the slave identity devices 930 and 940 may generate service use information, but the network 910 may determine the service use of the slave identity devices 930 and 940 as the service use of the master identity device 920. In FIG. 9, although the network service is provided for each of the slave identity devices 930 and 940, the network 920 may determine service provision for the slave identity devices 930 and 940 as service provision for the master identity device 920, and the master identity device 920 may be charged for service provision of the master identity device and the slave identity device. That is, service provision of the slave identity devices 930 and 940 may be performed based on service provision of the master identity device 920.

Figure 10:
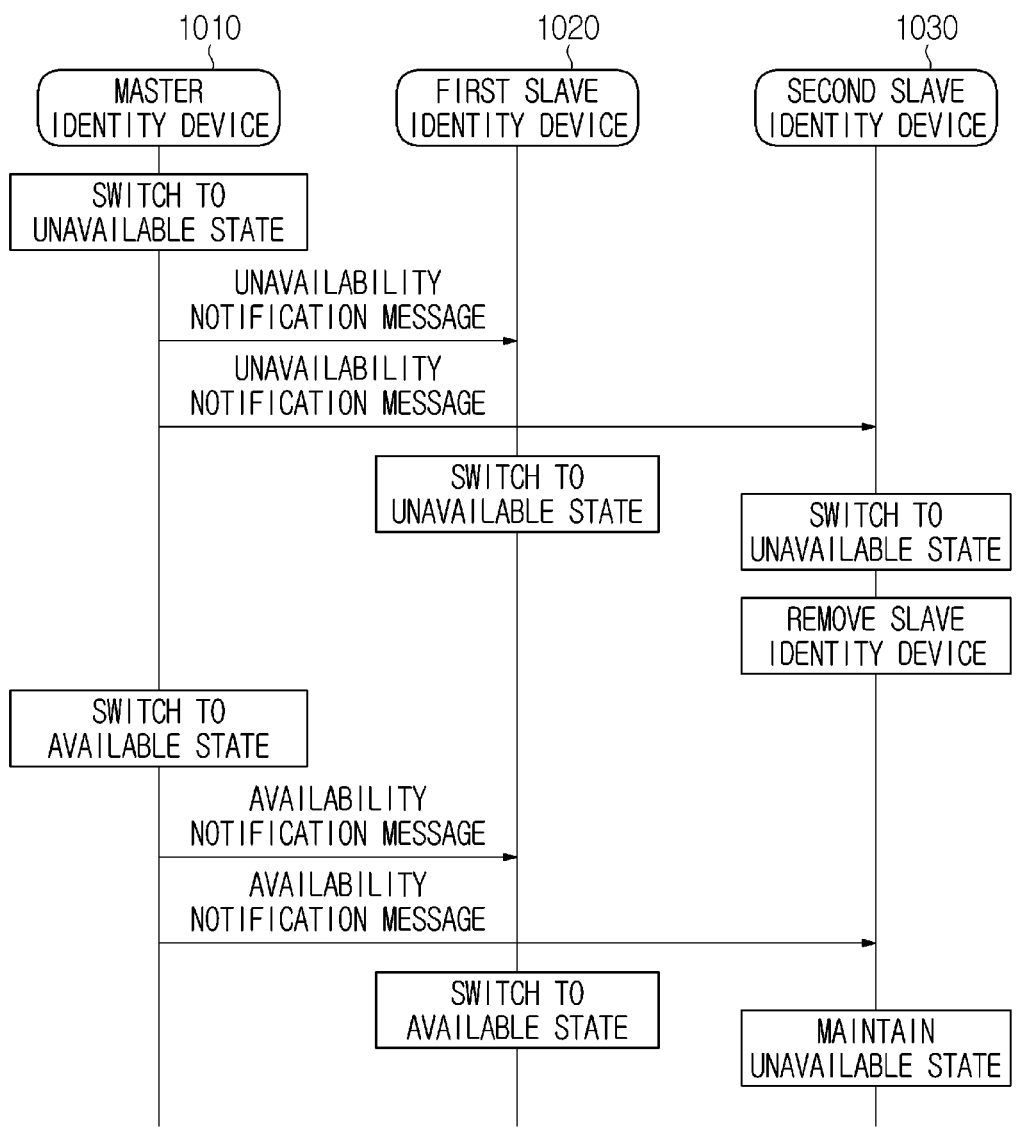
FIG. 10 is a flowchart illustrating a situation that a master identity device is unavailable, according to an embodiment of the present disclosure.
Figure 11:
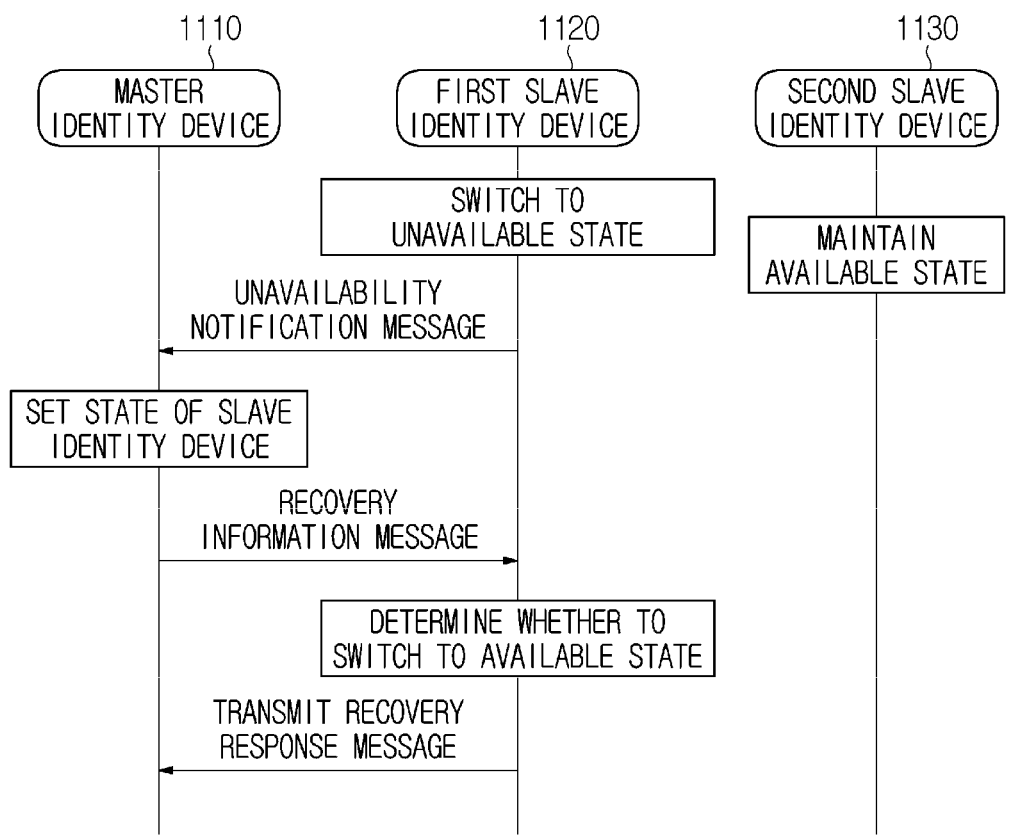
FIG. 11 is a flowchart illustrating a situation that a slave identity device is unavailable, according to an embodiment of the present disclosure.

FIG. 10 is a flowchart illustrating a situation that a master identity device is unavailable, according to an embodiment of the present disclosure, and FIG. 11 is a flowchart illustrating a situation that a slave identity device is unavailable, according to an embodiment of the present disclosure.

FIGS. 10 and 11 are views illustrating a dependent operation relationship between the master identity device and the slave identity device. The state of the identity device may be switched to an unavailable state due to apparatus use suspension, identity device removal, identity device authority change, identity device use suspension, user device turn-off, etc. For example, when the use of the moving object is terminated and thus the moving object is turned off, the state of the master identity device provided in the moving object may be switched to the unavailable state. In addition, as another example, the state of the slave identity device may be switched to the unavailable state due to termination of use of the user device in which the slave identity device is installed or removal of the slave device by the user.

FIG. 10 shows an example in which the state of the master identity device 1010 is switched to the unavailable state due to termination of use of the apparatus. When the state of the master identity device 1010 is switched to the unavailable state, the master identity device 1010 may transmit, to the slave identity devices 1020 and 1030, an unavailability notification message indicating that the master identity device is in the unavailable state. The slave identity devices 1020 and 1030, which have received the unavailability notification message from the master identity device 1010, may switch the state of the slave identity devices 1020 and 1030 to the unavailable state regardless of the state of the slave identity device or the user device. The state of the slave identity devices 1020 and 1030 may be switched due to dependency between the master identity device 1010 and the slave identity devices 1020 and 1030.

The unavailable state of the master identity device 1010 may be switched to the available state due to resume of the apparatus. When the state of the master identity device 1010 is switched to the available state, the master identity device 1010 may transmit, to the linked slave identity devices 1020 and 1030, an availability notification message indicating that the master identity device 1010 is in the available state. The slave identity devices 1020 and 1030, which have received the availability message from the master identity device 1010, may change the state of the slave identity devices 1020 and 1030 based on the state of each slave identity device. When the state of the slave identity device 1030 is switched to the unavailable state (e.g., removal of the slave identity device) while the master identity device 1010 is in the unavailable state, the slave identity device 1030 may be maintained in the unavailable state despite transmission of the availability message from the master identity device 1010. FIG. 10 shows a state in which the second slave identity device is removed while the master identity device 1010 is in the unavailable state. In this case, the second slave identity device, which has received the availability message, may be maintained in the unavailable state.

FIG. 11 is an example in which the state of a first slave identity device 1120 of a plurality of slave identity devices 1120 and 1130 is switched to an unavailable state. When the state of the first slave identity device 1120 is switched to the unavailable state, the first slave identity device 1120 may transmit an unavailability notification message to the master identity device 1110.

The master identity device 1110, which has received the unavailability notification message for the first slave identity device 1120, may set the state of the slave identity device for the first slave identity device 1120. That is, the master identity device 1110 may set the state of the first slave identity device 1120 to the unavailable state. Since the unavailability notification message is not received from the second slave identity device 1130, the master identity device may not switch the state of the second slave identity device.

The master identity device 1110 may periodically transmit a recovery information message to the slave identity device 1120, the state of which is switched to the unavailable state. The first slave identity device 1120, which has received the recovery information message, may determine whether to switch the state to the available state based on the actual use state of the identity device. The slave identity device 1120, which has received the recovery information message, may transmit a recovery response message to the master identity device. For example, the recovery information message may be a trigger message for allowing the slave identity device to determine the state of the slave identity device. In addition, the recovery response message may be information indicating whether the state of the slave identity device is switched to the available state.

When the state of the slave identity device is switched to the available state (e.g., when the slave identity device is installed in the user device) after transmission of the unavailability notification message or the recovery information message of a previous period, the slave identity device may transmit a recovery response message indicating that the state of the slave identity device has been switched to the available state to the master identity device. The master identity device may reset the states of the slave identity devices based on the transmitted recovery response message.

FIG. 11 shows an example in which the first slave identity device is installed in a user device and the state thereof is switched to the available state between transmission of the unavailability notification message and reception of the recovery information message. The first slave identity device 1120, which has received the recovery information message, may determine whether to switch the state to the available state based on the changed state and then transmit a recovery response message indicating switching to the available state to the master identity device 1110. The master identity device 1100 may reset the state of the first slave identity device 1120 based on the recovery response message.

The master identity device 1110 may not transmit the recovery information message to the second slave identity device 1130 which has not transmit the unavailability notification message, and may not reset the state of the second slave identity device 1130.

FIG. 12 is a view illustrating moving object control information stored in and managed by an identity device, according to an embodiment of the present disclosure.

The master identity device or the slave identity device may store user information. More specifically, services for the moving object may be diversified. For example, the vehicle as the moving object is currently used for driving, but users may not be distinguished. However, services provided to the user by the moving object are increasing, and settings or information considering personal preference or personal characteristics may be required. In consideration of the above points, the master identity device or the slave identity device may store information or settings of a specific user and apply it to the moving object. That is, the identity device may perform not only authentication but also a control device function for increasing the convenience of using the moving object.

At this time, in the present disclosure, information for controlling the moving object may be referred to as moving object control information. In addition, the moving object control information may correspond to information stored in and managed by the identity device, and the moving object control information may correspond to information stored and managed for each user of the moving object. For example, information stored in and managed by the master identity device for each user may include vehicle setting, autonomous driving level, vehicle seat, instrument panel mode setting, used channel setting, navigation setting, personal device setting, mirror setting, etc., without being limited thereto.

In addition, as another example of the present disclosure, the moving object control information may be classified into moving object common information and user-specific information and managed. That is, even when a plurality of users is registered in one identity device, information may be classified into and managed as user-specific information required for each registered user and common information commonly applied to all registered users.

In addition, in the present disclosure, the user-specific information is information updated and applied when an identified user uses the moving object and may correspond to information, to which the characteristics and preference of each user are applied. In addition, the user-specific information may correspond to information generated for each user. As a non-limiting example, navigation setting or vehicle seat setting may differ between users and thus may be user-specific information. The user-specific information may include user information, moving object setting information and moving object related information according to an embodiment. As another example, the user-specific information may include autonomous driving level information, vehicle seat, instrument panel mode setting, used channel, navigation setting, personal device setting, mirror setting, etc. In addition, for example, the user-specific information may be information on driving type set in the personal device in various driving environments, such as the position and height of a driver's seat, the color and brightness of indoor lightings, the positions and angles of the room mirror and side view mirror, an inside temperature control (air conditioner and heater) range, the angle of a steering wheel, tire pressure, the transmission setting mode (normal, eco, power mode, etc.), the wireless communication connection mode (WAVE, cellular, etc.), an autonomous driving function setting variable range (speed and vehicle interval, transverse speed for lane change, acceleration and deceleration, etc.), and a widget function. In addition, for example, the user-specific information may include an instrument panel mode, navigation setting, content setting, etc. In addition, the user-specific information may include a variety of information in addition to the above-described information, and is not limited to the above-described embodiment. That is, user setting information may be included in the identity device such that a customized service to a user who uses the moving object and the moving object is controlled in consideration of the user.

The master identity device or the slave identity device may distinguishably manage, store, update and use the common information and the user-specific information. More specifically, the user-specific information and the moving object common information may be updated and added in a process in which the user uses the moving object. At this time, for example, for navigation setting or vehicle seat setting corresponding to the user-specific information, information of a user who has logged in may be continuously added and updated while the user uses the moving object. For example, information on a destination frequently used by the user, a display mode of navigation, a volume setting mode, etc. may be updated as the user-specific information.

In addition, as a specific example, various services may be provided through the master identity device or the slave identity device. For example, the moving object driving record may be stored through the master identity device. In addition, the moving object driving record may be checked individually and may be used through a server or a system.

More specifically, existing moving object driving information and related information may be stored and shared based on the moving object. At this time, when the master identity device is applied to the moving object, the user may be identified through the master identity device, and the moving object driving information and related information may be stored and used for each user. For example, the moving object driving information may include at least one of visited area information, driving distance information, driving pattern information or driving route information. In addition, the moving object driving information may be used based on the master identity device or slave identity device user in connection with the moving object, and is not limited to the above-described embodiment. At this time, the user may store and use the moving object driving information related thereto based on the identity device, and even when the moving object is changed, the related information may be used. For example, the user may receive a service through autonomous driving or ITS infrastructure based on the information stored in the master identity device or the slave identity device. Services such as an autonomous driving level, information on restaurants located in the neighborhood, movement route information may be received in relation to the driving pattern of the user. At this time, as described above, the information may be managed through the identity device.

In addition, the moving object may perform communication with another device through the master identity device. For example, the other device may be a smart device, an IoT based peripheral, a home appliance capable of performing communication, or a device such as RSU or ITS infrastructure. At this time, the moving object may be identified and authenticated through the identity device and used, and communication with the above-described communicable apparatuses may be performed through the identity device. As another example, the slave identity device (e.g. USIM) of the smart device may be compatible with the master identity device of the moving object. In addition, the identity device may be installed in another device in the same manner as the moving object, and based on this, communication may be performed and services may be provided. As another example, one user may own the slave identity device for each user device. That is, the slave identity device may be installed in each user device, and user information indicated by the slave identity devices may be the same. That is, the same user may use the slave identity device based on the same user ID in various devices. At this time, for example, based on the same user ID information, the moving object and another user device may interwork. At this time, since a plurality of devices is controlled based on the same user ID and the same user, it is possible to increase security. In addition, each user device may store information necessary for the user and then transmit the information to another user device. For example, each user device may periodically update use history information of the device of the user based on machine learning. Thereafter, the updated use history information may be exchanged with another user device and another use device may be controlled based on the information. That is, the user may control various user devices through a plurality of master identity devices or slave identity devices based on the same ID. At this time, charging information may be provided based on one user ID, thereby increasing user convenience.

Figure 13:
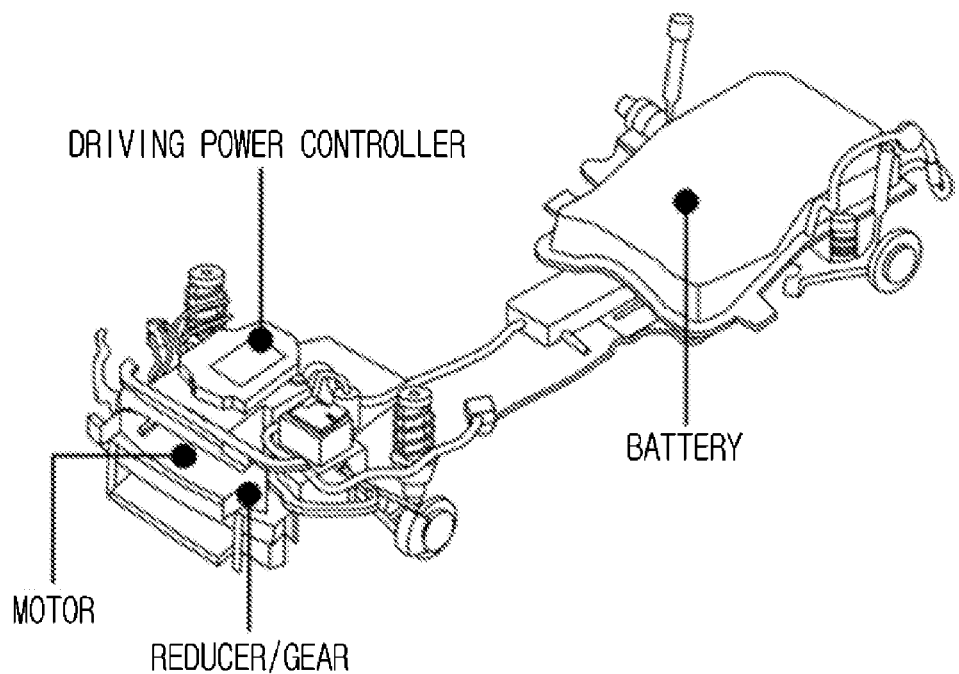
FIG. 13 is a view showing an example of a mobility power transmission system.

FIG. 13 is a view showing a moving object according to an embodiment of the present disclosure.

In the present disclosure, the moving object may include a motor, a reducer, a gear, a driving and power controller, a battery, etc. and may refer to an object which autonomously can move. In addition, this is not limited to the form shown in FIG. 13.

Figure 14:
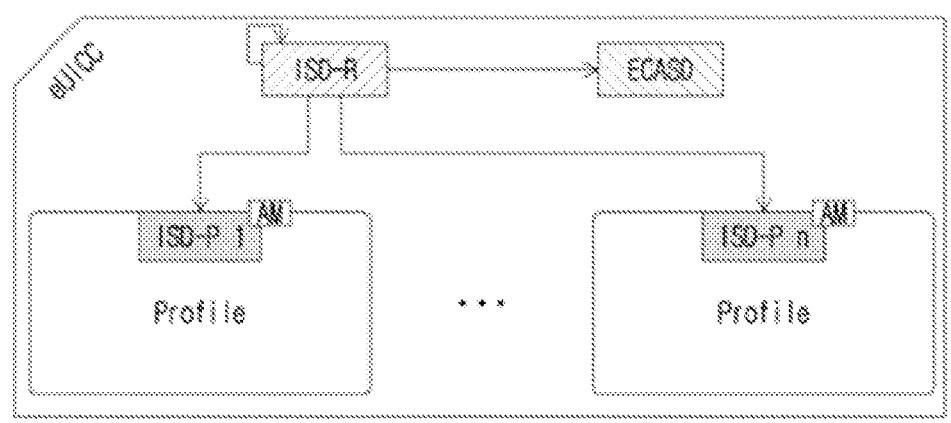
FIGS. 14 and 15 are views showing the configuration of an identity device.

FIG. 14 is a view showing a method of performing operation based on an identity device embedded therein. For example, as described above, the master identity device or the slave identity device may store profile information as shown in FIG. 14. The profile information may be user related information or information stored for use of the moving object. At this time, in consideration of security of the moving object and supplement of the identity device, a component accessible to the profile and a component for performing authentication with the moving object may be distinguished. That is, the component accessible to the profile in the embedded identity device may acquire information on control of the moving object from the profile and transmit the information to the component for performing authentication with the moving object. In addition, operation based on a component other than the component disclosed in FIG. 14 is possible, without being limited to the above-described embodiment.

Figure 15:
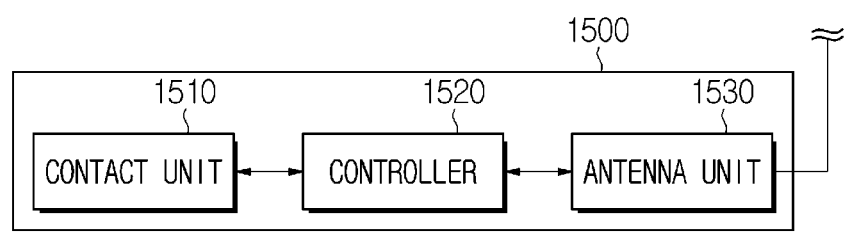

FIG. 15 is a view showing an identity device. Referring to FIG. 15, the identity device 1500 may include a contact unit 1510 which may be brought into contact with a moving object or another device for recognition. In addition, for example, the identity device 1500 may include a controller 1520 for controlling and managing operation based on the identity device 1500. In addition, the identity device 1500 may include an antenna unit 1530 for performing communication with another device and exchanging data. The controller 1520 may manage the contact unit 1510 and the antenna unit 1530 and may control the other components. In addition, the above-described components may be implemented in hardware or software. That is, the above-described components may be physically included in the identity device 1500 or may be a software component operating based on the operation and function of the identity device 1500, without being limited to the above-described embodiment.

Figure 16:
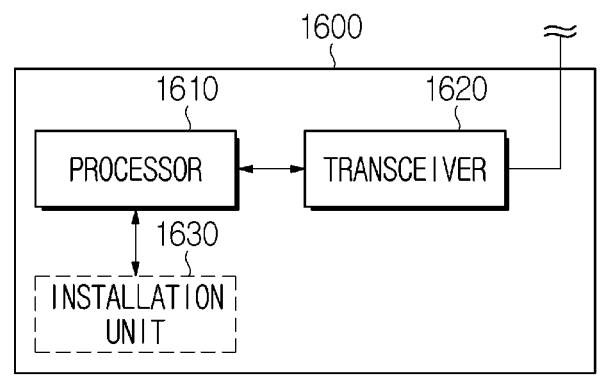
FIG. 16 is a view showing the configuration of a moving object according to an embodiment of the present disclosure.

FIG. 16 is a view showing the configuration of an apparatus. Referring to FIG. 16, the apparatus may include at least one of the above-described moving object, a device, a server or an RSU. That is, the apparatus may communicate or cooperate with another device, without being limited to the above-described embodiment. For example, the apparatus 1600 may include a processor 1610 and a transceiver 1620 for the above-described operation. That is, the apparatus may include a component necessary to perform communication with anther apparatus. In addition, the apparatus may include components other than the above-described components. That is, the apparatus includes the above-described components in order to perform communication with another device, without being limited thereto, and may operate based on the foregoing.

In addition, for example, the apparatus 1600 may further include an installation unit 1630 in which another device (e.g., a master identity device or a slave identity device) is installed. At this time, the installation unit may be included in the moving object in the form shown in FIGS. 2A, 2B, 2C, 2D, 3A, and 3B. For example, the installation unit 1630 may be implemented in any one area of the front side of the driver's seat in the moving object. In addition, the installation unit 1630 may be implemented in the passenger seat kit inside the moving object. Further, the installation unit 1630 may be implemented in the mirror inside the moving object. Moreover, the installation unit 1630 may be implemented in the moving object in the form of a cradle or a paddle, as described above. That is, the apparatus 1600 may further include the installation unit 1630 for recognizing the identity device as another device, as described above, recognize another device based on the same, and perform authentication. For example, the installation unit 1630 may be implemented in the moving object. At this time, the installation unit 1630 may be implemented in the apparatus 1600 as a physical component. As another example, the installation unit 1630 may be implemented in the apparatus 1600 as a software component. At this time, when the installation unit 1630 is implemented in the apparatus 1600, the identity device may be implemented in the apparatus 1600 as a physical or software component as described above, without being limited to the above-described embodiment.

According to the present disclosure, it is possible to control a moving object using a master identity device and a plurality of slave identity devices.

According to the present disclosure, it is possible to identify a user of a moving object based on an identity device and provide a service.

The technical problems solved by the present disclosure are not limited to the above technical problems and other technical problems which are not described herein will become apparent to those skilled in the art from the above description.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method of operating a moving object having a master identity device, the method comprising:
   setting authority for the master identity device;
   transmitting a link request message from the master identity device to one among the at least one slave identity device;
   receiving a link response message by the master identity device from the slave identity device;
   transmitting a link permission message indicating link permission from the master identity device to the slave identity device, and
   transmitting an unavailability notification message indicating that the master identity device is in an unavailable state to the slave identity device when a state of the master identity device is switched from an available state to the unavailable state, wherein the moving object is configured to be controlled by at least one of the master identity device or the slave identity device.

2. The method of claim 1, further comprising providing authority to a user device, in which the slave identity device is installed, to access a service available to the moving object.

3. The method of claim 2, wherein the user device, in which the slave identity device is installed, comprises at least one of another moving object different from the moving object, a smartphone, a tablet PC, a laptop, a smart watch, an Internet of Things (TOT) device, a navigation device, a wearable device, or a body insert chip.

4. The method of claim 2, wherein the service available to the moving object comprises at least one of a network access service performed using a network equipment of the moving object or a service performed using software of the moving object.

5. The method of claim 1, wherein the master identity device has at least one of user setting authority for at least one of the master identity device or the at least one slave identity device, authority setting rights for the at least one slave identity device, or communication setting authority for a user device which has at least one slave identity device.

6. The method of claim 1, wherein an operation of the moving object controlled by the master identity device comprises at least one of position or height setting of a seat including a driver's seat, indoor lighting color setting, indoor lighting brightness setting, setting of an air conditioner including an inside temperature, navigation setting, TV and radio setting, content setting, wireless communication connection mode setting, steering wheel control, autonomous driving variable setting, room-mirror and side-view mirror position and angle setting, wiper setting, transmission setting mode, or instrument panel mode setting.

7. The method of claim 1, wherein the slave identity device has limited authority to control the moving object compared to the master identity device.

8. The method of claim 7, wherein an operation of the moving object controlled by the slave identity device comprises at least one of position or height setting of a seat excluding a driver's seat, indoor lighting color setting, indoor lighting brightness setting, setting of an air conditioner including an inside temperature, navigation setting, TV and radio setting, content setting, or wireless communication connection mode setting.

9. The method of claim 1, further comprising transmitting, when a state of the master identity device is switched from the unavailable state to the available state, an availability notification message indicating that the master identity device is in the available state to the slave identity device.

10. The method of claim 9, wherein further comprising setting a state of the slave identity device, which has received the availability notification message, in consideration of a current state of the slave identity device.

11. The method of claim 1, further comprising:
receiving, from the at least one slave identity device, an unavailability notification message indicating that a state of the slave identity device has been switched from the available state to the unavailable state; and
updating state information of the slave identity device.

12. The method of claim 11, further comprising transmitting recovery information message to the slave identity device,
wherein the slave identity device, which has received the recovery information message, determines whether to switch the state of the slave identity device to the available state.

13. The method of claim 12, further comprising, by the master identity device, receiving a recovery response message from the slave identity device,
wherein the recovery response message is information indicating whether the state of the slave identity device has been switched to the available state.

14. The method of claim 13, wherein the transmitting the recovery information massage comprises transmitting recovery information message periodically to the slave identity device until the recovery response message is received.

15. The method of claim 1, wherein the master identity device includes an embedded subscriber identity module (SIM) in the moving object.

16. A moving object having a master identity device, the moving object comprising:
a transceiver configured to transmit and receive a signal; and
a processor configured to control the transceiver,
wherein the processor is configured to:
set authority for the master identity device,
transmit a link request message from the master identity device to one among the at least one slave identity device,
receive a link response message from the slave identity device, and
transmit a link permission message indicating link permission to the slave identity device, and
transmit an unavailability notification message indicating that the master identity device is in the unavailable state to the slave identity device when a state of the master identity device is switched from an available state to an unavailable state,
wherein the moving object is configured to be controlled by at least one of the master identity device or the slave identity device.

17. The moving object of claim 16, wherein the moving object is configured to communicate with a user device in which the slave identity device is installed such that the user device has authority to access a service available to the moving object.

18. The moving object of claim 16, wherein the master identity device has at least one of user setting authority for the master identity device or the at least one slave identity device, authority setting rights for the at least one slave identity device, or communication setting authority for a user device having the at least one slave identity device transferred to be installed.

19. A user device having a slave identity device, the user device comprising:
a transceiver configured to transmit and receive a signal; and
a processor configured to control the transceiver,
wherein the processor is configured to:
receive a link request message from a master identity device of a moving object,
transmit a link response message to the master identity device,
receive a link permission message indicating link permission from the master identity device, and
transmitting an unavailability notification message to the master identity device, the unavailability notification message indicating that a state of the slave identity device has been switched from an available state to an unavailable state, wherein the moving object having the master identity device is configured to be controlled by at least one of the master identity device or the slave identity device, and the master identity device updates state information of the slave identity device in response to receiving the unavailability notification message.

* * * * *